United States Patent [19]

Roberts

[11] Patent Number: 4,548,254
[45] Date of Patent: Oct. 22, 1985

[54] METHOD OF MANUFACTURING A DIE-CAST WOBBLE PLATE ASSEMBLY

[75] Inventor: Richard W. Roberts, Lombard, Ill.

[73] Assignee: Borg-Warner Corporation, Chicago, Ill.

[21] Appl. No.: 509,700

[22] Filed: Jun. 30, 1983

[51] Int. Cl.⁴ .............................................. B22D 19/00
[52] U.S. Cl. .................. 164/112; 29/156.5 R; 164/98
[58] Field of Search ............................. 164/98–112; 29/156.5 R; 91/471, 472, 499; 123/58 B, 58 BC; 403/267, 269, 122

[56] References Cited

U.S. PATENT DOCUMENTS

| | | | |
|---|---|---|---|
| 1,680,705 | 8/1928 | Thomson | 164/111 |
| 2,076,971 | 4/1937 | Soulis et al. | 22/126 |
| 2,464,050 | 3/1949 | Morin | 18/59 |
| 2,743,517 | 5/1956 | Everett | 29/528 |
| 3,384,949 | 5/1968 | Morin | 29/430 |
| 3,535,986 | 10/1970 | Daub | 92/228 |
| 3,763,535 | 10/1973 | Gallagher | 29/149 |
| 3,786,543 | 1/1974 | Sato | 29/149 |
| 4,062,395 | 12/1977 | Sirmay | 164/9 |
| 4,270,255 | 6/1981 | Klimek | 29/156 |
| 4,453,300 | 6/1984 | Klimak | 164/100 X |

*Primary Examiner*—Nicholas P. Godici
*Assistant Examiner*—G. M. Reid
*Attorney, Agent, or Firm*—Florian S. Gregorczyk

[57] ABSTRACT

An improved method of manufacturing a swash plate assembly for use in a compressor, fluid motor or similar device in which a plurality of pistons are connected, by means of connecting rods, to a swash plate which drives (or is driven by) the pistons. A plurality of ball ended rods of a predetermined length having a pair of split die-inserts positioned about the rod, each against one of the balls. The balls are positioned in a die means having a central core to locate their position and which die means securely maintains the inserts against each of the ball ends. About one ball end of the rod, a piston with or without a slot is cast and the opposite ball end, which is positioned in a mating swash plate socket, has a swash plate cast about it. The finished assembly is machined for overall length, surface parallel, and, angular and diametral relationships.

5 Claims, 6 Drawing Figures

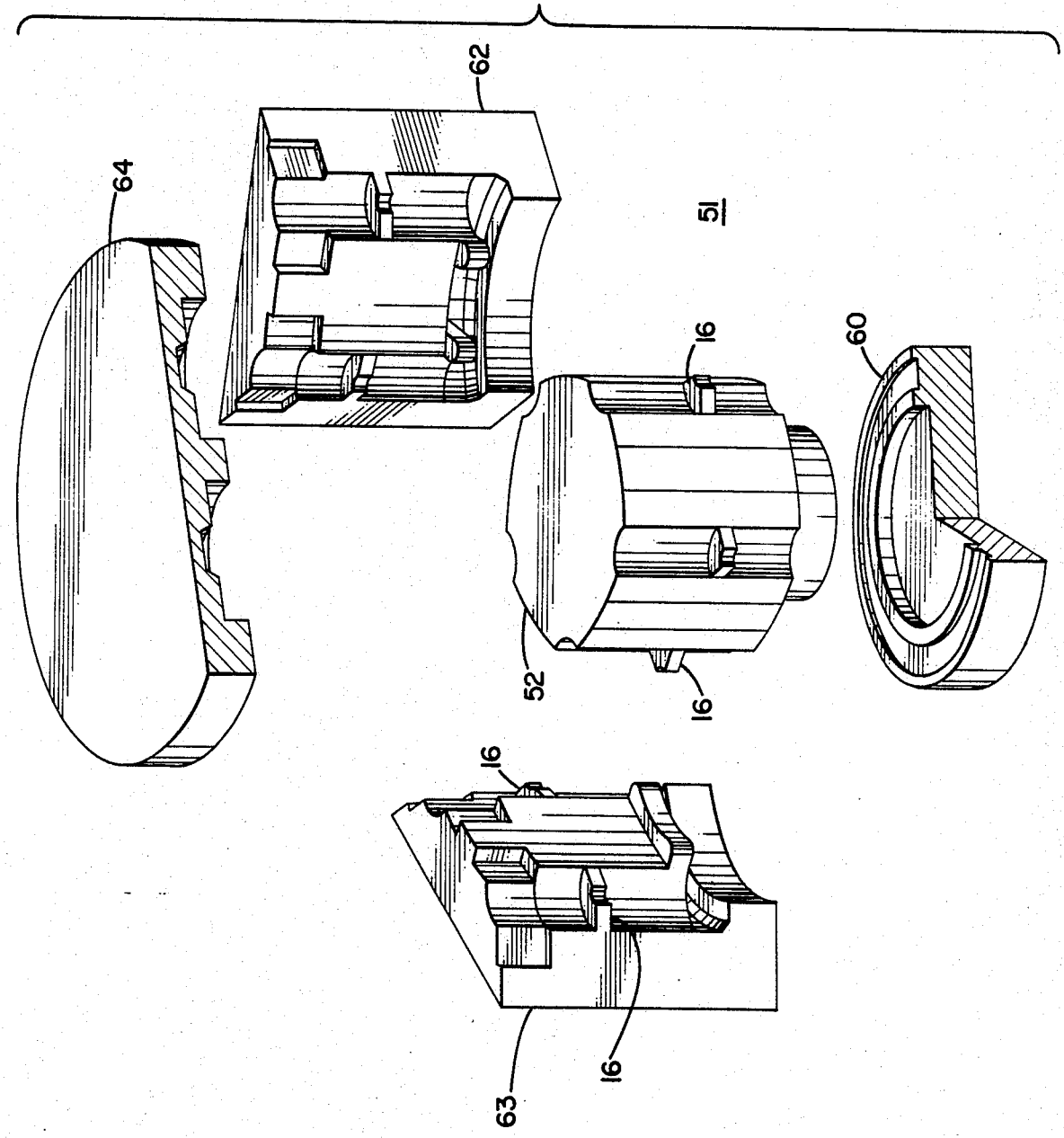

METHOD OF MANUFACTURING A DIE-CAST WOBBLE PLATE ASSEMBLY

BACKGROUND OF THE INVENTION

1. Field of the Invention

A method of manufacturing a wobble or swash plate assembly by a die-cast method.

2. Description of the Prior Art

The prior art is replete with techniques for the casting of metals, ceramics and plastics into various parts including ball and socket arrangements. These castings are frequently two element parts, such as a socket member cast about a ball so that the socket retains the ball and is movable about the ball. However, the use of die inserts to fix the relative location of such sockets in a multipart ball and socket assembly is not well known.

The casting of a fused quartz (ceramic) insulator about a ball-headed rod is disclosed in U.S. Pat. No. 1,680,705 to Thompson. A bimetal piston arrangement is taught in U.S. Pat. No. 2,076,971 to Soulis et al., wherein an aluminum head is cast about a precast body and wrist pin of iron or steel. However, neither of these patents nor their combined teachings illustrate the casting of a piston and swash plate assembly at opposite ends of a spherical ended rod to provide relative rotatable motion to the rod.

A method of casting end stops on a zipper utilizing a closed die is illustrated in U.S. Pat. No. 2,464,050 to Morin. The zipper stringer is merely placed in the die without locating means and the casting is made about such zipper stringer. A die insert for use in the casting of hypodermic needle assemblies is shown in U.S. Pat. No. 2,743,517 to Everett, but such castings are fixed members and are not required to flex, twist, turn or move. U.S. Pat. No. 3,384,949 to Morin discloses a method to cast a multiple part end product which may rotate around an axis perpendicular to the plane of rotation. However, the accumulated or individual teachings of these patents do not show a method of casting a double ended rod with a ball and socket arrangement cast at each end thereof.

Various disclosures teach the casting of a piston and wrist pin such as the Soulis et al. '971 patent above and the U.S. Pat. No. 3,535,986 to Daub which utilizes a die insert to control the skirt diameter of a piston. The teaching of a ball and socket cast piston is illustrated in U.S. Pat. No. 3,763,535 to Gallagher, however, this patent only teaches this piston and connecting rod assemblage. This use of die inserts for the production of rods with ball ends or movable means is further demonstrated in the U.S. Pat. No. 3,786,543 to Sato wherein a spherical element coated with a resin film is set in a die and secured in position therein against such inserts. After the die is closed, a connecting rod is cast about his spherical element and upon its removal the spherical element is freely rotatable in the connecting rod. The rotatable element in Sato '543 is not free to pivot about the race into which it is case, and the cast piston in the patent to Gallagher '535 is again just a ball ended connecting rod cast into a piston. Further, Gallagher '535 requires the cast metal to be at a pressure which will provide the required clearance between ball and piston socket.

The casting of complex or multipart assemblies in one operation is demonstrated in U.S. Pat. No. 4,062,395 to Sirmay, but the patent discloses a complex die and a finished part within a single die. A multipart casting is also taught in the U.S. Pat. No. 4,270,255 to Klimek wherein two separate parts are cast about ball ended and matable rods or tubes. In this patent a piston is cast about one rod or tube ball end and a swash plate is cast about the opposite rod or tube ball end. Each part is individually machined. These tube and rod means are then mated and the final distance between such swash plate and piston is fixed by welding of the mating rods.

The evolution and development of this casting assembly and finish machining art points out the problems of part location in a die, critical finish machining and casting to final dimensions which now culminates in the method of the present invention by which it is possible to cast a piston and swash plate assembly and then finish machine such assembly to required height, as well as, parallel, angular, and diametral surface requirements.

SUMMARY OF THE INVENTION

This invention relates to a new and improved method of manufacturing, by casting, a swash plate and piston assembly which includes a plurality of pistons connected to the swash plate. Axial motion is transmitted to the pistons by the nutating motion of the swash plate. If the assembly is to be used in a fluid motor, the reciprocating motion of the pistons would drive such swash plate.

The basic manufacturing steps of this process include:

1. fabrication of the plurality of piston or connecting rods, each rod having a dumbbell-like shape with ball ends thereon;

2. positioning a pair of split die inserts on each of said rods each in a position to abut one of the ends of the connecting rods;

3. providing a piston and swash plate die defining complementary sockets wherein the ball ends of each rod are located in complementary sockets;

4. positioning the balls and the die inserts in the casting die;

5. casting the plurality of pistons and the swash plate wherein each piston encircles one of said ends of the connecting rods and the swash plate defines the complementary sockets for each piston connecting rod; and, 6. machining said piston and swash plate assembly to predefined dimensions.

DESCRIPTION OF THE DRAWINGS

In the figures of the drawings like reference numerals identify like components and in the drawings:

FIG. 6 is an exploded perspective view, partially in cross-section, of a representative die configuration.

DETAILED DESCRIPTION OF THE INVENTION

Figure 1:
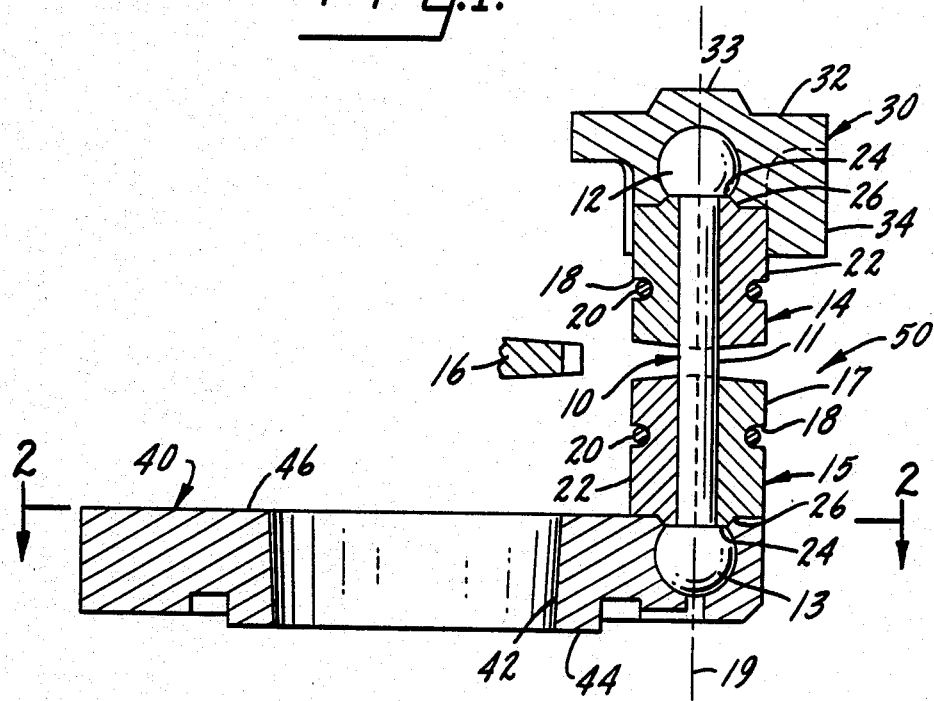
FIG. 1 is a cross-section of a rod having ball ends with the wobble plate and piston mounted thereon, and a cross-section of the die inserts positioned about said rod.

The present invention provides a method of conveniently and accurately casting a piston and wobble or swash plate assembly with ball and socket connecting joints. Ball and socket assemblies are used extensively to allow combinations of axial, rotational and orbital movements in machinery. Such machinery components include pistons, drive plates and crank shafts in pumps and compressors, actuating toggles for presses and punches, connecting rods and assemblies in conveyor systems. They are suitable for use in swash plate assemblies as described in the present specification.

There are other methods for constructing such swash plate assemblies. An example of such other methods is shown in the U.S. Pat. to Klimek No. 4,270,255 wherein the wobble plate is cast about a piston rod and ball, and a piston is cast about a ball and hollow rod section. The rod sections are thereafter joined together to produce the finished assembly and welded in position to a final dimension length. Each of these subassemblies require separate casting and machining and these subassemblies must be accurately located and then welded.

To produce strong assemblies capable of withstanding repeated heavy loads or to produce precise assemblies with a controlled or minimum movement or play between the ball and socket requires a maximum amount of conformity of the ball to the socket. This degree of conformity in a machined and assembled part requires large deformation of the socket material, is time consuming and necessitates expensive procedures and equipment. The optimal "fit" also demands a large degree of deformation of the socket material which by necessity may require the use of a soft, weak material that might result in cracking or stresses which act to weaken the assembly.

The high pressure to deform the walls of an aperture to conform a ball to a socket requires that the ball be made of a high strength material that will resist crushing during formation. This strength requirement limits the selection of ball materials with possible penalties in desired properties or economy.

Aside from the problem cited above, high pressures are needed to form the socket but do not assure full conformity of this socket to the spherical surface of the ball. As a result of incomplete forming, and also because of wrinkling and buckling of the deformed materials, the applied loads are not uniformly distributed over the spherical surface of the ball. During use of the ball and socket this uneven loading results in concentrated loads which cause overloading and failure. Load concentrations also cause excessive wear on contact points, which wear increases the amount of relative movement in the socket, thereby further complicating loading and leading to premature failure.

Any and all of the methods of assembling a ball and socket are such that precise dimensions of the assembly are difficult to maintain. In many applications two or more ball socket joints are connected to form a piece of machinery. Final dimensioning of such machinery or apparatus must be performed by machining.

In many of the mechanical forming processes for ball and sockets, a spacer material or coating on either the ball or components is employed to assure that a specified or some amount of relative movement will exist between ball and socket if only to assure free movement. The spacers must be removed by dissolving, heating or by mechanical means.

Other methods of forming the ball and socket assembly include the use of wires, rods or pins which prevent the escape of the ball from the socket. Another ball and socket forming operation requires machining spherical apertures into two separate sections and then connecting the separate sections after enclosing the ball. The final connections could be made by fasteners, springs, brazing, etc.

A preferred method for manufacture of ball and socket junctions includes the technique of inserting the ball and its appendages during manufacture of the socket by molding of liquid, super plastic, powdered metals, polymer compounds, or preferably by die-casting of molten metal, such as aluminum.

The pistons of a variable displacement pump, compressor or fluid motor are attached to a driving plate by connecting rods. The movements of both the pistons and drive plate require the flexibility of a ball and socket junction. The assembly can contain a multiple number of pistons attached to the swash plate. These pistons must be machined on the head surfaces for overall dimensions, and to contour the ring grooves on the outer diameter. On the other hand, the swash plate must be machined on the bottom and inner diameter surfaces for contour and flatness. The final assembly of pistons and swash plate must be assembled to a tolerance of 0.001–0.002" in final length. Therfore, it is desirable to provide a means to machine such final assembly as opposed to the machining of the separate pieces. Further, it is desirable to cast the pistons and swash plates about the ball members on the connecting rods as a major economical measure.

Figure 4:
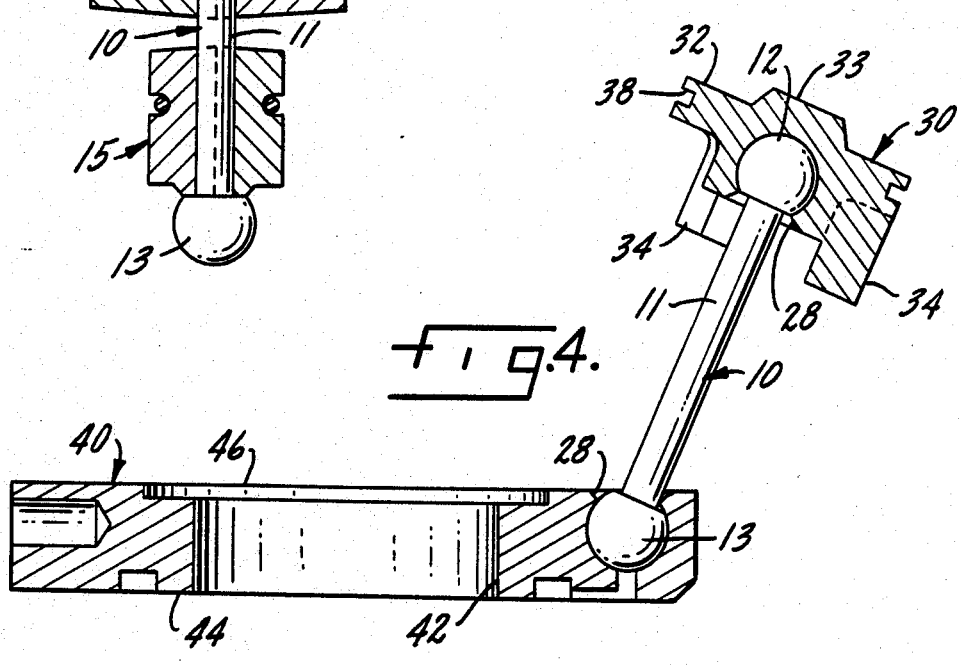
FIG. 4 illustrates a wobble plate and piston assembly as in FIG. 1, and in position to be machined; and, FIG. 5 illustrates a conventional piston and piston skirt with die inserts for casting.

Referring to the drawings and particularly to FIG. 1 a swash plate and piston assembly 50 of a piston 30 and swash plate 40 with connecting rod 10 is illustrated. Rod 10 includes central rod section 11 of predetermined length, a longitudinal axis 19, and prefabricated spherical ends or balls 12 and 13 positioned at the ends of rod section 10 which is shown in FIG. 1 as a dumbbell-like shape in this example. Mounted about rod section 10 are split die inserts 14 and 15. Die inserts 14 and 15 define retaining and locating grooves 18. Positioned in grooves 18 are holding rings 20 to secure split die inserts 14 and 15 with bodies 17 on rod section 10. Also shown in FIG. 1 is a securing member 16 of a die means, which is illustrated as a wedge-shaped positioned between inserts 14, 15 to secure them against ball ends 12, 13 respectively. Die inserts 14, 15 include a body with a first diameter 22 and a second diameter 24, which define a sloped shoulder 26 therebetween. Second diameters 24 of each insert, which is smaller than first diameter, 22 contacts contact ball ends 12, 13 and define angular clearance positions 28 noted in FIG. 4 for both the piston 30 and swash plate 40.

Figure 2:
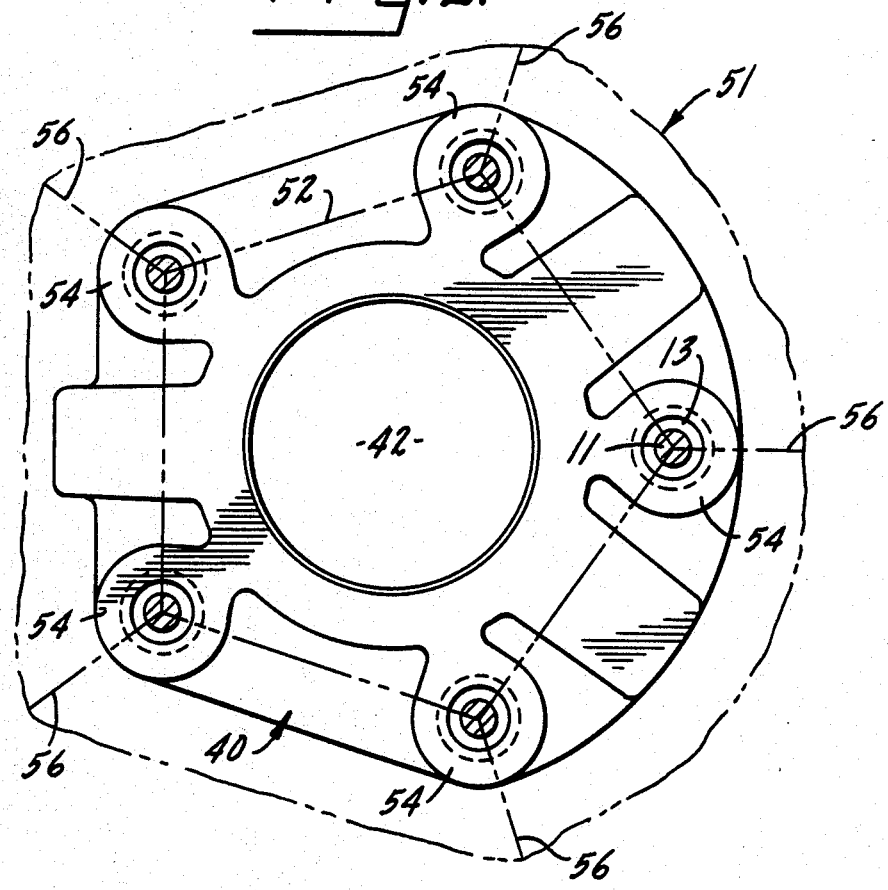
FIG. 2 is a plan view of the wobble plate of the die and central plug along line 2—2 of FIG. 1 with the parting lines shown in broken line.
Figure 3:
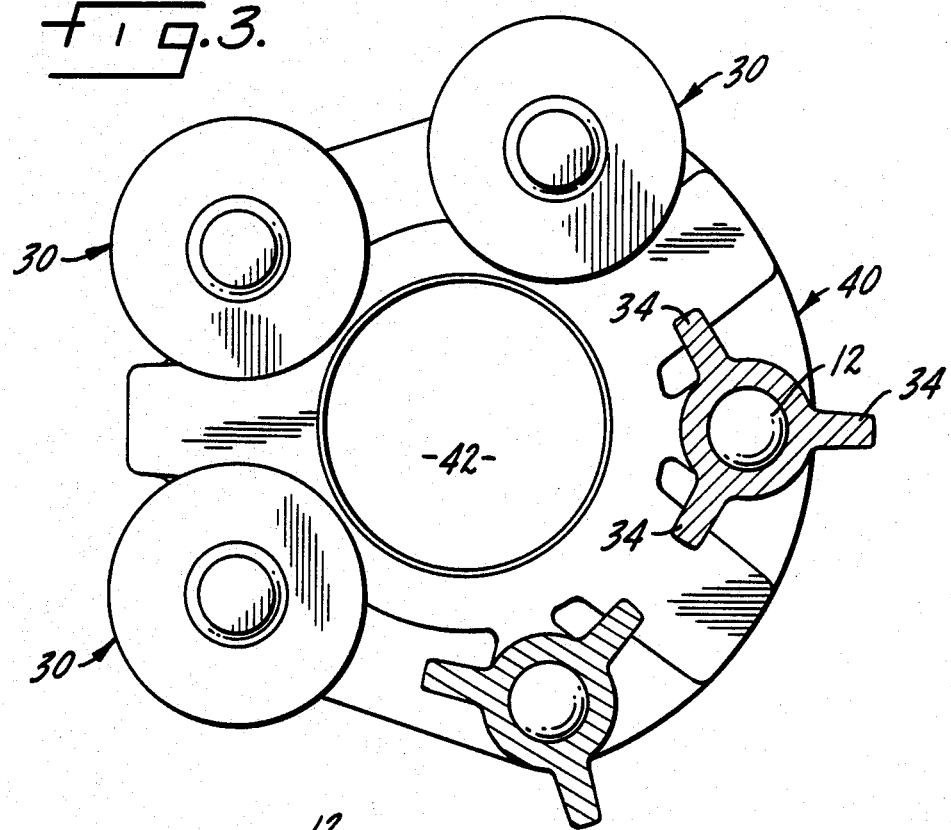
FIG. 3 is a top plan view of the piston and rod assembly of FIG. 1 with vertical lands with portions shown in section.
Figure 5:
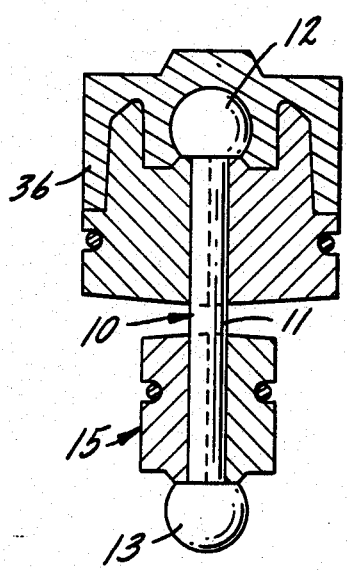

Rod 10 with die inserts 14, 15 secured against one of the ball ends 12, 13 respectively, by wedge-shaped member 16 is positioned in a die-casting or other type of casting mold shown in FIG. 2. A piston 30 is shown cast about ball end 12. Piston 30 defines a top 32, a crown 33 and land sections 34. These lands 34 provide stability in a cylinder, but reduce the piston weight from that of a conventional piston with a piston skirt 36 as shown in FIG. 5. FIG. 5 includes a split die insert which provides a side clearance to permit the casting of piston skirt 36.

Finish machining operations on piston 30 and swash plate 40 are performed after casting. These operations include the machining of ring grooves 38 shown in FIG. 4, top 32 and crown 33, and the outer diameter of piston 30. Similarly, swash plate 40, which defines inner diameter 42, bottom 44 and top 46 is machined in this as-cast position. This as-cast assembly is in a configuration such that the dimensions may be machined to their required tolerances after removal from a die.

FIG. 6 is an exploded perspective view illustrating a possible die configuration or set 51. Die set 51 includes a bottom plate 60, side members 62 and 63, a top plate 64 and central plug member 52. Not shown are the remaining side members to close the die set, but such members would have shapes and contours similar to side members 62 and 63. Alternatively, top plate 64 could be integral with side members 62, 63. The die members cooperate to define a plurality of piston cavities and a swash plate cavity.

Proposed die 51 configuration for such a wobble plate assembly 50 is illustrated in FIG. 2 wherein the pentagonal figure outlined by dashed lines 52 is a central plug member of such die 51. This plug defines the inner surfaces of the five piston castings, the upper interior surface of the wobble plate, and helps locate the split die inserts. Wedge member 16 may be an integral part of such plug. In FIG. 2 the structure illustrated includes five positions for piston and rod locations 54. This five position configuration is for purpose of illustration and not limitation. In this configuration the parting lines 56 of such die, as known in the art, indicate those parts along which the casting die is removed. Inner diameter 42 of swash plate member 40 is defined in the as-cast structure by plug means 52 and such diameter inner surface is noted in FIG. 2 as 42. After casting plug means 52 and die means 51 are opened along parting lines 56 and the as-cast assembly 50 is removed. In this as-cast configuration the plurality of rod section 10, pistons 30 and swash plate 40 comprise finished assembly 50 with ball ends in the sockets defined by swash plate 40 and pistons 30.

The foregoing describes the completed swash plate and piston assembly 50 and broadly describes the manufacture of such assembly. The following preferred casting procedure details such manufacture;

(1) Ball ends 12 and 13 are joined to a section of rod or tubing 10 of the correct final length. The ball and stem assembly so formed is coated with a mold-release agent and heated (300°–400° F.) approximately) to drive off any volatiles in the coating, to preheat the ball, and stress relieve any weldment or other joining method utilized on the ball.

(2) The die inserts 14, 15 are placed about rod section 10 and positioned against the ball ends 12, 13 respectively. The coated, preheated ball and stem assembly is placed into the cavity of a die-casting machine as described in U.S. Pat. No. 3,763,535. The die is located in relation to die central plug 52, and wedge members 16 securing inserts 14, 15 in position. The mold is closed and a casting of the piston 30 and swash plate 40 is made as per conventional die-casting procedures. The piston casting has a head and crown, and either lands as described above or a piston skirt as in FIG. 5.

(3) The piston and swash plate assembly or casting is placed into a fixture (not shown) which holds the components in position to allow final machining of the swash plate assembly to fix the total length of this assembly within required dimensions.

This finished structure may then have multiple finish machining operations performed thereon. Assembly 50 can consist of as many rods and piston sections as required for its general use but usually consists of at least three pistons 30 and rods cooperating with a swash plate 40.

As examples of specific variations of materials and processes referred to above to illustrate the scope of the method without limiting the method to the examples, the manufacture of the assembly could be performed by several variations. The materials of construction and method of manufacture of the balls can be of any type as currently available or practiced, or of any special type with specific physical properties as needed for a particular application. These special properties could include strength, wear or corrosion resistance or magnetic properties. Further, the materials, could be hard or soft steel, cast irons, copper or aluminum base alloys or non-metallic balls could be used as desired for properties or economy. The ball or balls can be attached to the connecting rod section or any appendage by soldering, brazing, resistance or fusion welding, adhesives or by any mechanical means such as screw threads. A single piece ball and stem unit is thereby produced and useable in this casting technique.

The connecting rod or appendage can be made of any material or process to provide the properties and/or economy required in this assembly. As an example, the rod and ball ends could be produced by cold heading, swaging, machining, casting or any other process known for use in the shaping of materials. The connecting rods could be made of a solid rod or bar, or tubing. Regardless of the method of manufacture the connecting rod and ball assembly should be of a finished dimension to allow casting of the head piston 30 and swash plate 40. After casting adequate material is available to finish machine this assembly to its final dimension.

Coatings applied to the ball sections prior to molding into the socket may be of a variety of materials and thicknesses as required for properties and economy, or to be compatible with the process or materials selected for ball-socket manufacture. As an example, hardened steel balls such as used for ball bearings, may be resistance welded to low carbon steel tubing and thereafter coated by dipping or spraying with an alcohol suspension of finally divided graphite. Upon drying at 400° F. for sufficient time to evaporate all of the alcohol, the entire ball and stem assembly is heated to stress relieve the welds, and the ball will thereafter be coated with a film or residue of graphite. Similar suspensions in water, alcohols or other suspending mediums could be used to deposit films of molybdenum disulfide or other solid lubricants. The coating could be produced by dipping or spraying of polymeric materials of the polyethylene or polybutadiene types which will carbonize without producing large volumes of vapor upon contact with liquid metal or any source of high temperature and thus provide a separating film between the ball and socket to assure free motion.

The coating materials depicted or described above are provided to prevent the sticking of ball and socket materials by producing an interference film between the ball and socket. The thickness of the interference film may be controlled by formulation or by repeated coating to provide a positive or specified clearance as required. Ideally, the coating material would also serve as a lubricant or initial wear-in component in the system, as with graphite or carbonized polymer coatings. The selection of the coating material will be dependent on the variables of the assembly including materials, molding process, service conditions, etc. As a further example of such selection, a steel ball when inserted into an iron socket casting could be coated with a sodium silicate material that will break up and act as a wear-in abrasive in the joint. Further, a steel ball molded in an aluminum powder compact socket could be coated with a phosphate conversion coating for separation and initial wear-in.

The degree of preheating of the coated ball will be determined by several factors of the coating in the molding process itself. As an example, volatile binders and vehicles in the coating must be driven off to prevent large quantities of gas in the mold during molding.

In the description of the casting method of the present invention the means for holding the insert 14, 15 described is a clip, spring or wire. However, if required, such holding means could include adhesives, magnetic parts or other means.

The molding process for forming a socket and casting the piston head described, as well as the swash plate, has been described particularly for use with a die-casting operating. However, the use of such die-casting process in this example for producing pistons and swash plates or drive plates, was selected on the basis of production quantities (economy) and the type of material required in the piston and swash plate. These two parts could be made of an aluminum alloy number 380. Any other aluminum base alloy compatible with the die-casting process and with the required chemical and mechanical properties of the part could also be used. Magnesium and zinc base die-casting alloys could be used if economy or property requirements allow or demand. Based on the consideration above, any metal casting process could be used, such as a sand mold, however, these are not deemed to be as economical as the preferred embodiment.

The design of the socket is not necessarily limited to containment about the entire periphery of the ball but could be partially slotted to allow greater travel in one or more directions.

Socket manufacture encompassing the present method need not be limited to metals or the casting of liquid metals. The ball ends as described can be contained in compacted metal powders and processed in the manner known to those familiar with the art for treating metal powder compacts to achieve required properties. The socket could be manufactured by molding or casting of polymeric materials according to procedures well known to those familiar with that casting art.

The design or function of the socket is not particularly limited to the piston and drive ring taught in the example but could be of any shape required. Such a shape would be dictated by the shape of the sloped shoulder 26, on inserts 14, 15.

The machining of piston 30 and swash plate 40 together allows a final dimension to be predetermined, that is, the height between the swash plate and the piston crown, as well as a ready means to determine surface and bore relationships. This single assembly for final machining eliminates the need to microfinish the surfaces, and fixes the angular and parallel surface relationships. Such single operation relationships are far easier to obtain than are multiple machined surface positions.

While this invention has been described in connection with certain specific embodiments thereof, it is to be understood that this is by way of illustration and not by way of limitation; and the scope of the appended claim should be construed as broadly as the prior art will permit.

I claim:

1. A method of manufacturing a piston and swash plate assembly, comprising the steps of:
    (a) fabricating a plurality of dumbbell-like connecting rods with spherical ends;
    (b) positioning a split insert at each end of each of said rods, such that each insert abuts one of said spherical rod ends;
    (c) providing a swash plate and piston die, which die defines piston cavities, a bottom plate, a central plug member, locating wedges and a top plate;
    (d) positioning said rod and inserts in said die set such that one of said rod ends is positioned in said piston cavities with its opposing rod end in proximity to said bottom plate and further positioning said locating wedges between said split inserts to maintain said inserts against said rod ends;
    (e) casting a swash plate and pistons about said spherical ends.

2. A method of manufacturing a piston and swash plate assembly in accordance with claim 1, further comprising the steps of removing said cast swash plate and pistons from said die and machining said assembly to finished dimensions.

3. A method of manufacturing a swash plate and piston assembly, comprising the steps of:
    (a) fabricating a plurality of dumbbell-like connecting rods with spherical ends, each rod having a central rod section of a predetermined overall length and a longitudinal axis, each rod terminating in spherical ends;
    (b) mounting a pair of split inserts on each of said connecting rods, each insert defining grooves to receive a holding ring, and each of said inserts encircling said rod and abutting one of said spherical ends;
    (c) providing a swash plate and piston die, said die including a central plug member with wedges, a top plate, a bottom plate and side members, which die members cooperate to define a plurality of piston cavities and a swash plate cavity;
    (d) positioning said connecting rods in said die such that a spherical end is provided in each of said piston cavities with the opposite spherical end of each rod positioned in said swash plate cavity;
    (e) securing said wedges between said rod mounted inserts to retain said inserts against said spherical ends; and
    (f) casting a swash plate and plurality of pistons about said spherical ends, which cast swash plate and pistons define sockets about said spherical ends.

4. A method of manufacturing a piston and swash plate assembly as claimed in claim 3, further comprising the steps of:
    (a) removing said cast swash plate and piston assembly; and
    (b) machining said swash plate and piston assembly to predefined dimensions.

5. A method of manufacturing a piston and swash plate assembly as claimed in claim 3, wherein said die defines piston cavities for casting said pistons with a crown, a top and lands perpendicular to said top.

* * * * *